United States Patent Office 3,703,514
Patented Nov. 21, 1972

3,703,514
1,3,5-TRIAZINES
Jan Marcel Didier Aron-Samuel, 116 Rue Carnot,
Suresnes, France, and Jean Jacques Sterne, 17 Boulevard Karl Marx, Argenteuil, France
No Drawing. Filed Jan. 27, 1969, Ser. No. 794,845
Claims priority, application France, Feb. 8, 1968, 139,099; May 8, 1968, 150,937; Dec. 31, 1968, 182,676
Int. Cl. C07d 55/20
U.S. Cl. 260—249.9
3 Claims

ABSTRACT OF THE DISCLOSURE

Triazines of formula:

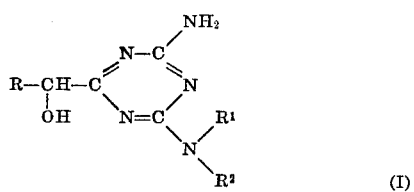

wherein R is hydrogen, an alkyl radical, a methylenedioxyphenyl radical or a phenyl radical optionally mono-, di- or trisubstituted with halogen atoms, alkyl, haloalkyl or alkoxy radicals, and $R^1$ and $R^2$ are hydrogen, an alkyl, alkenyl, cycloalkyl, dialkylaminoalkyl, piperidinoalkyl or morpholinoalkyl radical, one of substituents $R^1$ and $R^2$ being other than hydrogen or an alkyl radical when the other is itself hydrogen or an alkyl radical, or $R^1$ and $R^2$, together with the nitrogen atom to which they are attached, form a heterocycle or a C-alkylsubstituted heterocycle including, as second heteroatom, a nitrogen atom which carries an alkyl, alkenyl, hydroxyalkyl, phenyl or substituted phenyl radical, and their salts, have an activity on the central nervous system.

The present invention relates to new triazines active, in particular, on the central nervous system, of formula:

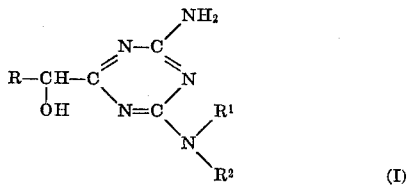

in which R is hydrogen, an alkyl radical, a methylenedioxyphenyl radical or a phenyl radical optionally mono-, di- or trisubstituted with halogen atoms, alkyl, haloalkyl or alkoxy radicals, and $R^1$ and $R^2$ are hydrogen, an alkyl, alkenyl, cycloalkyl, dialkylaminoalkyl, piperidinoalkyl or morpholinoalkyl radical, one of the substituents $R^1$ and $R^2$ being other than hydrogen or an alkyl radical when the other is itself hydrogen or an alkyl radical, or $R^1$ and $R^2$, together with the nitrogen atom to which they are attached, form a heterocycle optionally C-alkylsubstituted, including, as second heteroatom, a nitrogen atom which carries an alkyl, alkenyl, hydroxyalkyl, phenyl or substituted phenyl radical and their salts.

Preferably, the alkylsubstituted, alkenyl and alkoxy radicals included within the above definition are lower radicals.

Similarly, the heterocycle formed by $R^1$ and $R^2$ together with the nitrogen atom to which they are attached is advantageously a 5-, 6- or 7-membered ring.

It will be noted that compounds (I) may exist in tautomeric forms resulting from the conversion of the amino form of the substituents of the triazine nucleus to the imino form. On the other hand, the carbon atom of compounds (I) carrying substituent R is asymmetrical and compounds (I) may thus exist under optically active or racemic forms. These various forms of compounds I are included within the scope of the invention.

Such triazines were found to have interesting therapeutical properties for the central nervous system; in particular, they are anxiolytics, antidepressives, stimulants, antihallucinatory, anti-tremorine agents and also cardio-respiratory stimulants, and the invention relates also to a therapeutical composition comprising a therapeutically active amount of a triazine of formula (I) in admixture with a therapeutically acceptable vehicle.

Moreover, these thiazines can be used as weed-killers.

The invention relates also to a process for the preparation of these new triazines, comprising reacting an α-hydroxy-carboxylic acid of formula:

with a diguanide of formula:

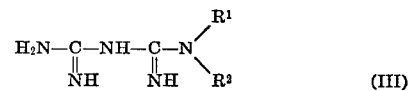

R, $R^1$ and $R^2$ having the above-defined meanings, and removing the resulting triazine from the reaction medium, as the free base or as a salt.

To carry out the process for the preparation of triazines according to the invention, the α-hydroxy-carboxylic acid (II) may be used as the free acid or in another reactive form. For example, good results were obtained with the anhydrides, acid halides, esters, amides or hydrazides corresponding to acids of formula (II).

The reaction is carried out by heating the reagents at a temperature below 100° C., in the absence of solvent and of catalyst. It is, however, promoted by the presence of alkaline catalysts. In this case, diguanide (III) is advantageously introduced as a salt, particularly as a hydrohalide, for example as a hydrochloride, dihydrochloride, hydrobromide, dihydrobromide, etc., which hydrohalide is preferably treated in situ with an alkaline agent, preferably with an alkali metal alkoxide such as sodium methoxide, to release the diguanide so that, after such release, there will remain a sodium methoxide equivalent useful as catalyst.

It is only after such release that the stoichiometric amount of the desired α-hydroxy-carboxylic acid or derivative thereof will be added.

The reaction is then generally carried out in alcohol medium, at room temperature, during 2–48 hours, or by refluxing the mixture during ½ hour, and the reaction mixture is then treated with water to separate the resulting triazine. The latter precipitates out immediately or after several hours, and it is then dried and recrystallized.

It may be found advantageous to extract the triazine from the reaction medium using a suitable solvent such as methylene chloride. The solvent is then evaporated and the triazine is recrystallized from a suitable solvent, such as acetonitrile, alcohols, ketones, water or dimethylformamide.

Some diguanides (III) are new compounds. Said new diguanides are those of formula:

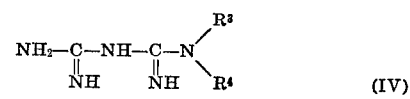

wherein $R^3$ and $R^4$ are hydrogen, an alkyl, dialkylaminoalkyl, piperidinoalkyl or morpholinoalkyl radical, one of the substituents $R^3$ and $R^4$ being other than hydrogen or an alkyl radical when the other is itself hydrogen or an alkyl radical or $R^3$ and $R^4$, together with the nitrogen atom to which they attached, form a heterocycle optionally C-alkylsubstituted, including, as second heteroatom, a nitrogen atom which carries an alkenyl, hydroxyalkyl- The characteristics of the above diguanides and of other diguanides prepared in a similar manner are given in Table I below.

TABLE I

| $R^3$ | $R^4$ | $NR^3R^4$ | Form | Melting point, °C., measured with Thiele's tube |
|---|---|---|---|---|
| Diethylaminoethyl | H | | 2 HCl | 171–173 |
| Diethylaminopropyl | H | | 3 HCl | [2] 225 |
| Diethylaminopropyl | H | | $H_2CO_3 \cdot 1H_2O$ | [2] 90 |
| Dimethylaminoisopropyl | H | | 2HCl | 236–237 |
| Dibutylaminopropyl | H | | $H_2CO_3 \cdot 1 H_2O$ | [2] 132–134 |
| Dibutylaminoethyl | H | | $H_2CO_3$ | 114–116 |
| Dipropylaminopropyl | H | | $H_2CO_3 \cdot H_2O$ | 106–108 |
| Perhydroazepinopropyl | H | | $H_2CO_3 \cdot H_2O$ | [2] 103–105 |
| Dimethylaminoethyl | Methyl | | 2 HCl | 254 |
| Do | Ethyl | | 2 HCl | 179–181 |
| Diethylaminoethyl | Methyl | | 2 HCl | 194–195 |
| Dimethylaminopropyl | do | | 2 HCl | 218–220 |
| Diethylaminoethyl | Isopropyl | | [1] | 98–100 |
| | | 4-propyl-piperazinyl | 2 HBr | 232–234 |
| | | 4-hydroxyethyl-piperazinyl | 2 HBr | 168–170 |
| Piperidinoethyl | H | | 2 HCl | 186–188 |
| | | | [1] | 109–110 |
| | | 4-allyl-piperazinyl | 2 HBr | 235–237 |
| Morpholinopropyl | H | 4-phenyl-piperazinyl | 2 HCl | [2] 230–232 |
| | | 4-(4'-chlorophenyl)-piperazinyl | 3 HCl | [2] 261–263 |
| | | 4-isopropyl-piperazinyl | 2 HBr | 218–220 |
| | | 4-methyl-perhydro-1,4-diazepinyl | 2 HBr | 215–217 |

[1] Base. [2] Decomposes.

phenyl or substituted phenyl or alkyl radical, said alkyl radical being other than methyl when the heterocycle is the piperazinyl group.

The alkyl radicals included within the above definition are preferably lower radicals.

These new diguanides (IV), useful in the synthesis of triazines (I) are also included within the scope of the invention. Moreover, it should be noted that said diguanides possess per se therapeutically valuable antidiabetic, anti-inflammatory and anticholinergic properties.

To prepare biguanides (IV) an hydrohalide of an amine of formula:

wherein $R^3$ and $R^4$ have the above defined meanings, is reacted with cyano-guanidine:

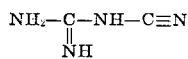

This reaction is generally carried out under dry conditions, as a melt, or in a solvent such as butanol, Cellosolve, and the like.

Two examples of preparation of diguanides (IV) will be given below for illustration purposes.

(A) 1-diguanyl-4-n-propyl piperazine

Into a flask are charged 21 g. of cyanoguanidine and 400 ml. of butanol. The mixture is heated to refluxing temperature and 72.5 g. of N-n-propyl piperazine di-hydrobromide are added thereto portionwise, over one hour. Refluxing is maintained during five hours. The product precipitates out on cooling. It is recrystallized from ethanol at 95° C. 72 g. of di-hydrobromide are obtained, melting at 232–234° C. using Thiele's tube.

Analysis.—Calculated (percent): Br, 42.72; N, 22.46. Found (percent): Br, 42.74; N, 22.53.

(B) 1-[2'-diethylamino)ethyl]-diguanide

Into a flask are charged 84 g. of cyanoguanidine, 250 ml. of Cellosolve, and 189 g. of 2-diethylamino-ethylamine di-hydrochloride. The mixture is refluxed during three hours. After cooling, 900 ml. of acetone are poured in. The resulting gum is redissolved in 150 ml. of methanol. 500 ml. of acetone are poured in, until a persistent haze is obtained. The product crystallizes slowly. It is recrystallized from absolute ethanol. 114 g. of di-hydrochloride, melting at 171–173° C. using Thiele's tube are obtained.

Analysis.—Calculated (percent): Cl, 25.96; N, 30.77. Found (percent): Cl, 25.97; N, 30.90.

The following examples illustrate the preparation of triazines (I), prepared from diguanides (IV) as defined above or from other diguanides within the scope of Formula III.

EXAMPLE 1

2-amino-4-α-hydroxyheptyl-6-(4'-methyl)-piperazinyl-1,3,5-triazine

Into a flask are charged 51.5 g. of 1-diguanyl-4-methyl piperazine di-hydrochloride (0.2 M.), 140 ml. of methanol and 300 ml. of a 2 N methanol solution of sodium methoxide. After stirring for a few minutes, 37.6 g. of ethyl α-hydroxycaprylate (0.2 M.) dissolved in 20 ml. of methanol are added thereto. The reaction mixture is stirred during 5 hours, and is then allowed to rest during 48 hours, and is then poured over 400 ml. of distilled water; dissolution is thereby obtained. After extracting with methylene chloride, the extracts are washed with water and dried, and the solvent is then removed. The resulting yellow oil is taken up into 100 ml. of absolute ethanol and isopropanol in hydrochloric acid solution is added to pH 2. After diluting with absolute ethanol, the resulting material is filtered and recrystallized from 500 ml. of absolute ethanol. 15 g. of di-hydrochloride, which decomposes at about 270° C., are thus obtained, the decomposition temperature being determined using Thiele's tube.

Analysis.—Calculated (percent): C, 47.24; H, 7.87; O, 4.20; N, 22.05. Found (percent): 47.47; H, 8.08; O, 3.79; N, 21.89. Melting point of the base: 80–82° C.

The NMR spectrum is consistent with the structure.

EXAMPLE 2

2-amino-4-α-hydroxy(3',4'-methylenedioxy)-benzyl-6-(4'-n-propyl)-piperazinyl-1,3,5-triazine Into a flask are charged 187 g. of 1-diguanyl-4-n-propyl-piperazine di-hydrobromide (0.05 M), 300 ml. of methanol and 750 ml. of a 2 N sodium methoxide solution in methanol. After stirring for a few minutes, 112 g. of ethyl 3,4-methylenedioxy-mandelate dissolved in 100 ml. of methanol are added thereto. The reaction mixture is stirred during 4 hours and is then allowed to rest during 24 hours, after which 100 ml. of distilled water are then added thereto; a gum which sets within 3 hours precipitates out. The product is washed with water, dried and recrystallized from acetonitrile, to give 65 g. of base melting at 148–150° C. using Thiele's tube.

Analysis.—Calculated (percent): C, 58.05; H, 6.50; O, 12.89; N, 22.57. Found (percent): C, 58.10; H, 6.72; O, 12.91; N, 22.72.

The NMR spectrum is consistent with the structure.

EXAMPLE 3

2-amino-4-diethylaminoethylamino-6-α-hydroxy-benzyl-1,3,5-triazine

Into a flask are charged 136 g. of 1-diethylaminoethyl-diguanide di-hydrochloride (0.5 M), 300 ml. of methanol and 750 ml. of a 2 N solution of sodium methoxide in methanol. The reaction mixture is stirred during a few minutes and 90 g. of ethyl mandelate dissolved in 100 ml. of methanol are then added thereto. The reaction mixture is stirred during 4 hours and is then allowed to rest during 24 hours after which is it again stirred during 4 hours and 100 ml. of distilled water are added thereto; complete dissolution is obtained. After extracting with 3 × 500 ml. of methylene chloride, the extracts are washed with water and dried, and the solvent is then removed. The resulting oil is dissolved in refluxing acetonitrile and is then treated with carbon black. The desired product crystallizes on cooling. It is recrystallized from isopropanol. It melts at 134° C., using Thiele's tube.

*Analysis.*—Calculated (percent): C, 60.73; H, 7.65; O, 5.06; N, 26.56. Found (percent): C, 60.71; H, 8.01; O, 5.16; N, 26.65.

The NMR spectrum is consistent with the structure.

EXAMPLE 4

2-amino-4-allylamino-6-α-hydroxy(4'-methoxy)-benzyl-1,3,5-triazine

From 9 g. of allyldiguanide hydrochloride, 10.5 g. of ethyl p-methoxymandelate, 50 ml. of 2 N methanol solution of sodium methoxide and 40 ml. of methanol are prepared, using a procedure similar to that of Example 3, 3.3 g. of product melting at 162° C. using Thiele's tube.

*Analysis.*—Calculated (percent): C, 58.62; H, 5.96; O, 11.14; N, 24.38. Found (percent): C, 58.58; H, 6.13; O, 11.28; N, 24.30.

The NMR spectrum is consistent with the structure.

EXAMPLE 5

2-amino-4-α-hydroxy(3'-methoxy)-benzyl-6-(4'-methyl)-piperazinyl-1,3,5-triazine From 12.7 g. of 1-diguanyl-4-methyl-piperazine di-hydrochloride, 10.5 g. of ethyl m-methoxymandelate, 75 ml. of 2 N methanol solution of sodium methoxide and 40 ml. of methanol are prepared, using a procedure similar to that of Example 3, 3.3 g. of product melting at 145° C. using Thiele's tube.

*Analysis.*—Calculated (percent): C, 58.16; H, 6.71; O, 9.69; N, 25.44. Found (percent): C, 58.01; H, 6.82; O, 9.85; N, 25.46.

The NMR spectrum is consistent with the structure.

The compounds (I) prepared in Examples 1–5 are racemic compounds. However, starting from optically active acid derivatives such as:

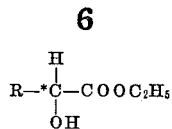

the enantiomorphs may be prepared. Thus, in particular, were prepared the optically active forms of compounds (I) wherein R is methyl and phenyl, respectively, and $NR^1R^2$ is a 4-methylpiperazinyl radical. These compounds have melting points of 150 and 163° C., respectively, and optical rotation $[\alpha]_D^{20°}$ of −12.5° and −18.7°, respectively, in ethanol solution.

In Table II below are set forth the characteristics of the triazines prepared in Examples 1–5 above, and of other triazines prepared in a similar manner.

In each space are indicated the melting point of the product and a code number thereof, consisting of symbols LA followed by a number; whenever necessary HCl or $H_2O$ are mentioned in parentheses when the product was prepared as the hydrochloride or as a hydrate.

TABLE II

| $R^1$ | H | H | H |
|---|---|---|---|
| $R^2$ | Allyl | Diethylaminoethyl | Dimethylaminopropyl |
| R— | | | |
| Hydrogen | 146–148<br>LA 1787 | | |
| Methyl | 99–100<br>LA 1785 | | |
| Ethyl | 86–87<br>LA 1655 | 83–85<br>LA 1803 | 88–90<br>LA 1819 |
| n-Butyl | 167–168 (HCl)<br>LA 1657 | 130–131<br>LA 1756 | |
| n-Hexyl | 104–106<br>LA 1631 | 75<br>LA 1789 | 98–99<br>LA 1807 |
| Phenyl | 140–142<br>LA 1677 | 134–135<br>LA 1793 | 122<br>LA 1831 |
| p-Fluorophenyl | | 143–144<br>LA 1772 | 130–131<br>LA 1812 |
| p-Chlorophenyl | | 140<br>LA 1752 | 135–136<br>LA 1802 |
| p-Bromophenyl | | 138<br>LA 1770 | |
| o-Chlorophenyl | | 130<br>LA 1780 | 138–139<br>LA 1841 |
| m-Fluorophenyl | | 136–138<br>LA 1801 | |
| $R^1$ | H | H | H |
| $R^2$ | 1-dimethyl-amino-2-propyl | Dibutylaminopropyl | Dipropylaminopropyl |
| R—Phenyl | 141–142<br>LA 1813 | 98–99<br>LA 1821 | 108–110<br>LA 1836 |

TABLE II—Continued

| $R^1$ | Methyl | Ethyl | H | Methyl | H | H | H | H |
|---|---|---|---|---|---|---|---|---|
| $R^2$ | Dimethyl-aminoethyl | Dimethyl-aminoethyl | Cyclohexyl | Dimethyl-aminopropyl | Allyl | Diethylami-noethyl | Dimethyl-aminopropyl | 1-dimethyla-mino-2-propyl |
| R— | | | | | | | | |
| p-Methyl phenyl | | | 161–163<br>LA 1665 | | | 128<br>LA 1784 | 136<br>LA 1744 | 170–172<br>LA 1794 |
| p-Isopropyl phenyl | | | | | | 104–106<br>LA 1776 | | |
| p-Methoxy phenyl | | | | | 160<br>LA 1676 | 106<br>LA 1848 | 132–134<br>LA 1786 | 177–179<br>LA 1790 |
| m-Methoxy phenyl | | | | | 94–96<br>LA 1632 | 96–97<br>LA 1781 | 142<br>LA 1849 | 139–140<br>LA 1771 |
| m-Trifluoro methyl-phenyl | | | | | | 128–129<br>LA 1782 | | |
| Ethyl | 124–126<br>LA1 815 | 73–75<br>LA 1816 | | 99–100<br>LA 1818 | | | | |
| 3,4-dichloro-phenyl | | | | | | 146–147<br>LA 1799 | | |
| m-Chloro phenyl | | | | | | 129–130<br>LA 1747 | 129–131<br>LA 1751 | |
| 3,4,5,-trimethoxy-phenyl | | | | | | 139<br>LA 1795 | 166–168<br>LA 1830 | 183<br>LA 1775 |
| 3,4-methylenedioxy-phenyl | | | | 136<br>LA 1718 | | 104–105<br>LA 1798 | | 172–173<br>LA 1708 |

TABLE II—Continued

| R¹ | H | H | H | Methyl |
|---|---|---|---|---|
| R² | Diethylaminopropyl | Morpholinopropyl | Piperidinoethyl | Diethylaminoethyl |
| R— | | | | |
| Ethyl | | | 012–104<br>LA 1820 | 67–69<br>LA 1814 |
| n-Butyl | | | 101–103<br>LA 1749 | |
| Phenyl | 104–106<br>LA 1763 | | 168–169<br>LA 1783 | 91–93<br>LA 1817 |
| p-Chloro phenyl | | | 171–173<br>LA 1766 | |
| p-Methyl phenyl | 120–133<br>LA 1804 | 166–167<br>LA 1743 | 166–168<br>LA 1832 | |
| m-Methoxy phenyl | 103–104<br>LA 1791 | | 133<br>LA 1833 | |
| 3,4,5-trimethoxy-phenyl | | | 138–140<br>LA 1765 | |
| 3,4-methyl-enedioxy-phenyl | 104–105<br>LA 1758 | 115–117<br>LA 1788 | 150–151<br>LA 1748 | |
| R—Ethyl | | | 103–104<br>LA 1750 | 123–125<br>LA 1824 |
| Phenyl | 153–155<br>LA 1842 | 190–193<br>LA 1633 | 155–156<br>LA 1753 | |
| p-Fluoro phenyl | | | 116–118<br>LA 1800 | |
| p-Chloro phenyl | | | 116<br>LA 1822 | |

| NR¹R² | 4-isopropyl piperazinyl | 4-methyl piperazinyl | 4-propyl piperazinyl | 4-(2'-hydroxyethyl)-piperazinyl |
|---|---|---|---|---|
| R— | | | | |
| Hydrogen | | 156–157<br>LA 1687 | 165–166<br>LA 1777 | |
| Methyl | | 150<br>LA 1688 | 117–119<br>LA 1768 | |
| Ethyl | 109–110<br>LA 1806 | 132<br>LA 1703 | 116–117<br>LA 1755 | 116–117<br>LA 1805 |
| n-Propyl | | 118–120<br>LA 1702 | | |
| n-Butyl | | ¹ 280<br>(2 HCL) | | |
| i-Butyl | | LA 1706<br>152–154 | | |
| n-Hexyl | | LA 1746<br>² 80–82 | | |
|  | | LA 1689<br>¹ 270<br>(2 HCl) | 72–73<br>LA 1779 | 86–87<br>LA 1834 |
| n-Nonyl | | ¹ 270<br>(2 HCl)<br>LA 1707 | | |
| n-Tetradecyl | | 158–162<br>LA 1835 | | |
| Phenyl | 149–151<br>LA 1759 | 163<br>LA 1693 | 158<br>LA 1773 | 192<br>LA 1823 |
| p-Fluorophenyl | | 128<br>LA 1697 | 120<br>LA 1762 | |
| p-Chlorophenyl | | 141–143<br>LA 1692 | 148<br>LA 1792 | |
| p-Bromophenyl | | 136–138<br>LA 1696 | | |
| m-Fluorophenyl | | 192–193<br>LA 1636 | | |
| p-Methylphenyl | | 147–148<br>LA 1674 | 133–134<br>LA 1774 | 153–155<br>LA 1754 |
| m-Chlorophenyl | | 210–212<br>LA 1757 | | |

| NR¹R² | 4-allyl-piperazinyl | 4-methyl-piperazinyl | 4-propyl-piperazinyl | 4-(2'-hydroxyethyl)-piperazinyl |
|---|---|---|---|---|
| R— | | | | |
| p-Isopropyl phenyl | | 148<br>LA 1695 | | |
| p-Methoxy phenyl | 121–122<br>LA 1846 | 162<br>LA 1690 | | 127–129<br>LA 1767 |
| m-Methoxy phenyl | | 145<br>LA 1705 | 118–119<br>LA 1761 | |
| m-Trifluoromethyl phenyl | 103–105<br>LA 1796 | 170–172<br>LA 1704 | 128–129<br>LA 1764 | |
| 2,4-dichloro-phenyl | | 142–143<br>LA 1709 | | |
| 3,4-dichloro-phenyl | | 163–165<br>LA 1699 | | |
| 3,4-dimethoxy-phenyl | | 105<br>LA 1691 | | |
| 3,4,5-trimethoxy-phenyl | | 172<br>LA 1694 | | |
| 3,4-methylenedioxy-phenyl | 123–125<br>LA 1808 | 166–168<br>LA 1698 | 148–150<br>LA 1778 | 156<br>LA 1845 |
| Cyclohexyl | | 169<br>LA 1760 | | |
| m-Fluoro phenyl | 165–167<br>LA 1769 | | | |

¹ Decomposed.   ² Base.

The results of toxicological and pharmacological tests are set forth below. They show the safe character of triazines (I) and their action on the central nervous system which insures a control of emotional disturbances, of the behavior and of the vegetative nervous system.

Determination of the toxic dosage in animals shows the enormous therapeutical range of these triazines since a dosage of 500 mg./kg. of body weight must almost always be used to arrive at the lower limit of the $LD_{50}$ in the series. Many examples are given below.

| Products | Rats | | Mice | | |
|---|---|---|---|---|---|
|  | Oral $LD_{50}$, mg./kg. | I.p. $LD_{50}$, mg./kg. | Oral $LD_{50}$, mg./kg. | I.p. $LD_{50}$, mg./kg. | I.v. $LD_{50}$, mg./kg. |
| LA 1631 | | | >1,000 | | |
| LA 1632 | | | >1,000 | | |
| LA 1657 | | | ≥1,000 | | |
| LA 1674 | 400 | | 1,125 | | |
| LA 1676 | >500 | | >1,000 | | |
| LA 1677 | >1,000 | >200 | >500 | | >100 |
| LA 1688 | 1,600–2,000 | | >1,000 | | >100 |
| LA 1689 | | | 575 | | |
| LA 1690 | 1,600 | | >1,000 | | |
| LA 1691 | >2,000 | | >2,000 | | |
| LA 1692 | 1,100 | | 600 | | |
| LA 1693 | 1,500–1,600 | | ≥1,500 | | |
| LA 1695 | ≥1,600 | | >1,600 | | |
| LA 1697 | >1,000 | | >1,000 | >200 | |
| LA 1698 | | >100 | >1,000 | | >100 |
| LA 1703 | 900 | 220 SC | 700 | 200<br>220 (SC) | 200 |
| LA 1705 | 1,000 | >200 | 1,600 | | >100 |
| LA 1706 | >500 | | >500 | | |
| LA 1707 | | | >400 | >50 | 100 |
| LA 1709 | | | 500–1,000 | | |
| LA 1743 | >500 | >500 | >1,000 | | >100 |
| LA 1744 | >500 | | >500 | | |
| LA 1746 | | | ≥500 | | |
| LA 1747 | | | 500 | | |
| LA 1752 | | | 500–1,000 | | |
| LA 1753 | | | >1,500 | >125 | |
| LA 1754 | >500 | | >500 | | |
| LA 1755 | | | 500–1,000 | | |
| LA 1758 | | | >1,000 | | |
| LA 1759 | ≥1,000 | | 500 | 100–250 | |
| LA 1761 | | | 500–1,000 | | |
| LA 1762 | | | 625 | 220 | |
| LA 1763 | >1,000 | | 1,000–1,500 | 250–500 | |
| LA 1764 | 10–1,000 | >200 | 100–1,000 | | <50 |
| LA 1766 | | | 1,000 | | |
| LA 1767 | | | >1,000 | | |
| LA 1770 | | | >1,000 | | |
| LA 1772 | | | >1,000 | 300 | |
| LA 1774 | >500 | >20 | >500 | | 100 |
| LA 1775 | | | >1,000 | 500 | |
| LA 1777 | >1,000 | >200 | >1,000 | | >100 |
| LA 1778 | >500 | >20 | >1,000 | | 1–100 |
| LA 1779 | 100–1,000 | 10–100 | 100–500 | | ≥50 |
| LA 1781 | >1,000 | | 1,300 | >200 | |
| LA 1782 | >1,000 | 10–200 | 100–1,000 | | 25–50 |
| LA 1784 | | | 1,000 | 100–500 | |
| LA 1785 | | | 1,000 | | |
| LA 1786 | | | >1,000 | | |
| LA 1787 | | | >500 | | |
| LA 1789 | | | 500 | | |
| LA 1790 | >500 | >100 | >1,000 | | 50–100 |
| LA 1791 | | | 1,000 | >250 | |
| LA 1792 | >500 | | >500 | | |
| LA 1793 | >500 | | 950 | 300 | |
| LA 1794 | >100 | >10 | >1,000 | | 50–100 |
| LA 1795 | >2,000 | | ≥2,000 | | |
| LA 1798 | >500 | | 1,400 | | |
| LA 1800 | | | >100 | | |
| LA 1802 | | | 1,000 | >250 | |
| LA 1803 | | | >500 | | |
| LA 1804 | >500 | >20 | >500 | | 1–100 |
| LA 1805 | | | >1,000 | | |
| LA 1806 | | | 200 | | |
| LA 1815 | | | 420 | | |
| LA 1822 | | | >1,000 | >100 | |
| LA 1823 | | | >1,000 | | |

Chronic toxicity tests carried out in rats by daily oral administration, during a period of time of three months, at dosages such as 10, 50 and 250 mg./kg., have shown, in particular with products LA 1674, LA 1676, LA 1689, LA 1692, LA 1693, LA 1703, LA 1705, LA 1778, LA 1793, LA 1798, the absence of evidence of toxicity both from the standpoint of the clinical and biological observation of the test animals and from the standpoint of the macroscopical and microscopical anatomical examination of all organs and viscera.

The pharmacological investigation has shown that it is particularly in the animal rendered abnormal by the action of drugs that triazines (I) have an action on the central nervous system, whereas triazines (I) show little activity in the normal animal. This is obviously of considerable interest. A table summarizing the essential results obtained in each test is given below.

With apomorphine, vomiting in dog, restlessness and chewing in rat, are antagonized with certain derivatives, while restlessness in rat is potentiated with other derivatives.

| Products | Apomorphine dosage, mg./kg. | Animal | Route | Restlessness | Vomiting or chewing | Dosage, mg./kg. |
|---|---|---|---|---|---|---|
| LA 1631 | 2 I.P. | Rat | Oral | Decreased | + | 25 |
| LA 1632 | 2 I.P. | Rat | do | do | Decrease | 25 |
| LA 1674 | 0.1 S.C. | Dog | S.C. |  | Complete protection | 10 |
| LA 1674 | 5 I.P. | Rat | I.P. | do | Decrease | 25 |
| LA 1677 | 3 I.P. | Rat | Oral | Increased | do | 50 |
| LA 1687 | 3 I.P. | Rat | I.P. | Decreased | + | 10 |
| LA 1688 | 3 I.P. | Rat | Oral | do | + | 50 |
| LA 1689 | 3. I.P. | Rat | do | do | Decrease | 50 |
| LA 1689 | 0.1 S.C. | Dog | S.C. |  | Complete protection | 25 |
| LA 1692 | 3 I.P. | Rat | I.P. | do | Decrease | 25 |
| LA 1693 | 5 I.P. | Rat | I.P. | do | do | 25 |
| LA 1697 | 2 I.P. | Rat | Oral | do | + | 5 |
| LA 1702 | 3 I.P. | Rat | I.P. | do | Decrease | 10 |
| LA 1703 | 0.1 S.C. | Dog | S.C. |  | Complete protection | 5 |
| LA 1703 | 3 I.P. | Rat | Oral | Complete protection | Strongly decreased | 50 |
| LA 1705 | 0.1 S.C. | Dog | S.C. |  | Complete protection | 25 |
| LA 1705 | 3 I.P. | Rat | I.P. | Decreased | Increase | 10 |
| LA 1706 | 0.1 S.C. | Dog | S.C. |  | Complete protection | 25 |
| LA 1744 | 3 I.P. | Rat | I.P. | Increased | Decrease | 10 |
| LA 1746 | 3 I.P. | Rat | Oral | Decreased | + | 50 |
| LA 1750 | 2 I.P. | Rat | do | Complete protection | Complete protection | 50 |
| LA 1754 | 3 I.P. | Rat | I.P. | Increased | + | 10 |
| LA 1755 | 2 I.P. | Rat | Oral | Strongly decreased | Decrease | 1 |
| LA 1757 | 2 I.P. | Rat | I.P. | Decreased | do | 50 |
| LA 1758 | 2 I.P. | Rat | Oral | Delayed | Delayed | 25 |
| LA 1762 | 3 I.P. | Rat | do | Decreased | Decrease | 50 |
| LA 1764 | 3 I.P. | Rat | I.P. | Complete protection | do | 10 |
| LA 1766 | 2 I.P. | Rat | Oral | Decreased | do | 50 |
| LA 1768 | 3 I.P. | Rat | do | do | + | 50 |
| LA 1771 | 2 I.P. | Rat | do | do | Decrease | 50 |
| LA 1779 | 2 I.P. | Rat | do | do | + | 50 |
| LA 1781 | 3 I.P. | Rat | I.P. | Increased | Increase | 10 |
| LA 1786 | 3 I.P. | Rat | Oral | do | do | 50 |
| LA 1792 | 2 I.P. | Rat | do | Decreased | Slight decrease | 50 |
| LA 1793 | 3 I.P. | Rat | do | Highly increased | Increase | 50 |
| LA 1795 | 3 I.P. | Rat | do | Increased | do | 50 |
| LA 1796 | 2 I.P. | Rat | I.P. | Complete protection | Complete protection | 50 |
| LA 1799 | 3 I.P. | Rat | I.P. | Increased | Decrease | 10 |
| LA 1801 | 2 I.P. | Rat | Oral | do | Increase | 5 |
| LA 1803 | 2 I.P. | Rat | do | Strongly decreased | Decrease | 25 |
| LA 1806 | 2 I.P. | Rat | I.P. | Complete protection | do | 25 |

NOTE. +=non-antagonized action; S.C.=sub-cutaneous.

With amphetamine, *in rat*, restlessness and chewing were antagonized simultaneously or separately.

| Products | Amphetamine dosage (mg./kg. I.P.) | Restlessness | Chewing | Dosage, mg./kg. | Route |
|---|---|---|---|---|---|
| LA 1655 | 10 | Decreased | Decrease | 50 | S.C. |
| LA 1674 | 15 | + | O | 50 | S.C. |
| LA 1689 | 15 | O | + | 50 | S.C. |
| LA 1692 | 12 | + | O | 50 | S.C. |
| LA 1693 | 10 | O | + | 50 | S.C. |
| LA 1703 | 12 | O | O | 20 | S.C. |
| LA 1706 | 15 | O | + | 10 | S.C. |
| LA 1707 | 15 | Delayed | + | 50 | S.C. |
| LA 1709 | 15 | O | + | 50 | S.C. |
| LA 1743 | 10 | Delayed | + | 25 | S.C. |
| LA 1746 | 10 | Decreased | Decrease | 50 | S.C. |
| LA 1755 | 15 | do | + | 20 | S.C. |
| LA 1768 | 10 | do | Decrease | 50 | S.C. |
| LA 1773 | 10 | do | + | 50 | S.C. |
| LA 1775 | 15 | O | + | 10 | S.C. |
| LA 1787 | 15 | Decreased | + | 20 | S.C. |
| LA 1792 | 10 | do | Decrease | 20 | S.C. |
| LA 1800 | 10 | do | do | 50 | S.C. |
| LA 1803 | 15 | O | + | 20 | S.C. |
| LA 1814 | 10 | O | Decrease | 25 | S.C. |
| LA 1822 | 15 | O | do | 20 | S.C. |
| LA 1824 | 10 | Decreased | do | 60 | S.C. |

NOTE.—O=antagonized action; +=non-antagonized action.

*In mice,* group toxicity tends to decrease.

| Products | Amphetamine dosage (mg./kg. I.P.) | Death rate | Dosage, mg./kg. | Route |
|---|---|---|---|---|
| LA 1631 | 15 | Decreased | 25 | Oral. |
| LA 1632 | 15 | do | 25 | Do. |
| LA 1674 | 15 | do | 1 | I.P. |
| LA 1687 | 25 | do | 50 | I.P. |
| LA 1688 | 15 | Strongly decreased | 50 | I.P. |
| LA 1689 | 15 | do | 0.1 | I.P. |
| LA 1692 | 25 | do | 100 | I.P. |
| LA 1693 | 15 | Decreased | 1 | Oral. |
| LA 1693 | 15 | do | 0.1 | I.P. |
| LA 1694 | 25 | do | 0.1 | I.P. |
| LA 1696 | 25 | do | 100 | I.P. |
| LA 1697 | 15 | do | 0.1 | I.P. |
| LA 1703 | 25 | Strongly decreased | 50 | Oral. |
| LA 1703 | 15 | do | 10 | I.P. |
| LA 1704 | 15 | Antagonized | 1 | I.P. |
| LA 1705 | 15 | Decreased | 0.1 | I.P. |
| LA 1706 | 15 | do | 10 | I.P. |
| LA 1707 | 15 | do | 10 | I.P. |
| LA 1743 | 15 | do | 0.1 | I.P. |
| LA 1743 | 15 | do | 10 | Oral. |
| LA 1744 | 15 | Strongly decreased | 10 | I.P. |
| LA 1750 | 15 | Antagonized | 1 | Oral. |
| LA 1753 | 15 | Decreased | 1 | Oral. |
| LA 1754 | 25 | do | 10 | I.P. |
| LA 1762 | 15 | do | 1 | Oral. |
| LA 1762 | 15 | do | 0.1 | I.P. |
| LA 1763 | 15 | Slightly decreased | 1 | Oral. |
| LA 1766 | 15 | Decreased | 1 | Do. |
| LA 1767 | 15 | do | 50 | Do. |
| LA 1768 | 20 | Strongly decreased | 10 | I.P. |
| LA 1771 | 15 | Antagonized | 1 | Oral. |
| LA 1773 | 15 | Decreased | 1 | I.P. |
| LA 1775 | 15 | do | 10 | Oral. |
| LA 1778 | 15 | do | 10 | I.P. |
| LA 1779 | 25 | Antagonized | 0.1 | I.P. |
| LA 1784 | 15 | do | 0.1 | I.P. |
| LA 1785 | 15 | Decreased | 10 | Oral. |
| LA 1787 | 15 | do | 10 | Do. |
| LA 1789 | 15 | do | 25 | Do. |
| LA 1792 | 15 | Strongly decreased | 10 | I.P. |
| LA 1793 | 15 | Decreased | 1 | I.P. |
| LA 1801 | 15 | do | 50 | Oral |
| LA 1801 | 15 | do | 0.1 | I.P. |
| LA 1802 | 15 | do | 1 | Oral. |
| LA 1803 | 15 | od | 10 | Do. |
| LA 1803 | 15 | do | 0.1 | I.P. |
| LA 1804 | 15 | Complete protection | 1 | I.P. |
| LA 1821 | 15 | Decreased | 25 | Oral. |
| LA 1822 | 15 | do | 1 | I.P. |

With pentobarbital, sleep in mice was potentiated by many derivatives. Pentobarbital is administered intraperitoneally at a dosage of 30 mg./kg.

| Products | Route | Out of 10 reference animals | Out of 10 treated animals | Dosage, mg./kg. |
|---|---|---|---|---|
| LA 1657 | I.P. | 1 | 7 | 50 |
| LA 1631 | I.P. | 0 | 4 | 10 |
| LA 1632 | I.P. | 0 | 4 | 50 |
| LA 1689 | I.P. | 0 | 7 | 50 |
| LA 1689 | Oral | 0 | 4 | 50 |
| LA 1692 | I.P. | 1 | 3 | 50 |
| LA 1693 | I.P. | 0 | 4 | 10 |
| LA 1703 | I.P. | 0 | 6 | 50 |
| LA 1703 | Oral | 0 | 5 | 50 |
| LA 1705 | I.P. | 0 | 3 | 50 |
| LA 1707 | I.P. | 1 | 6 | 20 |
| LA 1709 | I.P. | 0 | 5 | 50 |
| LA 1709 | Oral | 0 | 4 | 100 |
| LA 1743 | I.P. | 0 | 4 | 20 |
| LA 1750 | I.P. | 1 | 5 | 20 |
| LA 1762 | I.P. | 1 | 6 | 50 |
| LA 1762 | Oral | 1 | 6 | 100 |
| LA 1771 | I.P. | 1 | 7 | 10 |
| LA 1771 | Oral | 1 | 3 | 50 |
| LA 1772 | I.P. | 1 | 5 | 50 |
| LA 1776 | I.P. | 0 | 5 | 50 |
| LA 1777 | I.P. | 0 | 4 | 50 |
| LA 1778 | I.P. | 0 | 5 | 50 |
| LA 1778 | Oral | 0 | 4 | 100 |
| LA 1783 | I.P. | 2 | 6 | 50 |
| LA 1789 | I.P. | 0 | 3 | 20 |
| LA 1790 | I.P. | 2 | 5 | 20 |
| LA 1791 | I.P. | 0 | 6 | 50 |
| LA 1798 | I.P. | 0 | 5 | 20 |
| LA 1802 | I.P. | 0 | 3 | 50 |
| LA 1803 | I.P. | 2 | 7 | 50 |
| LA 1804 | I.P. | 0 | 6 | 20 |
| LA 1822 | I.P. | 0 | 6 | 20 |
| LA 1836 | I.P. | 0 | 4 | 50 |

With reserpine, administered intraperitoneally in mice at 2 mg./kg. hypothermia is potentiated or antagonized; some derivatives antagonize also reserpine induced ptosis, catalepsy and diarrhea.

With tremorine, antagonism in mice begins at different dosages, according to the derivatives; the minimum active dose in the series was 1 mg./kg. by the oral route. Tremorine was administered intraperitoneally at a dosage of 20 mg./kg.

| | Antagonism | | | | | | |
|---|---|---|---|---|---|---|---|
| Products | Trembling | Diarrhea | Salivation | Lacrimation | Duration, min. | Dose, mg./kg. | Route |
| LA 1636 | O | O | O | O | 75 | 50 | Oral. |
| LA 1665 | + | O | O | O | 120 | 100 | I.P. |
| LA 1688 | + | O | + | + | 45 | 50 | I.P. |
| LA 1694 | + | O | + | O | 120 | 50 | I.P. |
| LA 1695 | O | O | O | O | 30 | 50 | I.P. |
| LA 1697 | + | O | + | + | 90 | 50 | I.P. |
| LA 1698 | O | O | O | O | 360 | 100 | Oral. |
| LA 1698 | O | O | O | O | 120 | 50 | I.P. |
| LA 1703 | + | O | O | O | 60 | 50 | I.P. |
| LA 1708 | O | O | O | O | 90 | 50 | I.P. |
| LA 1709 | O | O | O | O | 75 | 50 | Oral. |
| LA 1743 | O | O | O | O | 60 | 50 | I.P. |
| LA 1746 | + | O | O | O | 30 | 50 | Oral. |
| LA 1754 | O | O | O | O | 120 | 50 | Do. |
| LA 1758 | O | O | O | O | 120 | 10 | I.P. |
| LA 1758 | O | O | O | O | 30 | 10 | Oral. |
| LA 1762 | O | O | O | O | 120 | 50 | Do. |
| LA 1763 | O | O | O | O | 30 | 50 | Do |
| LA 1763 | O | O | O | O | 30 | 50 | I.P. |
| LA 1772 | O | O | O | O | 75 | 50 | I.P. |
| LA 1778 | O | O | O | O | 120 | 10 | Oral. |
| LA 1778 | O | O | O | O | 120 | 1 | I.P. |
| LA 1782 | O | O | O | O | 120 | 50 | I.P. |
| LA 1788 | O | O | O | O | 60 | 25 | Oral. |
| LA 1791 | + | O | O | O | 30 | 50 | Do. |
| LA 1794 | + | O | + | + | 120 | 50 | Do. |
| LA 1795 | + | O | O | O | 60 | 50 | Do. |
| LA 1798 | O | O | O | O | 120 | 50 | Do. |
| LA 1798 | O | O | O | O | 60 | 10 | I.P. |
| LA 1803 | O | O | O | O | 60 | 50 | Oral. |
| LA 1804 | + | O | + | + | 120 | 50 | Do. |

Note.—O = antagonized action; + = non-antagonized action.

The pain induced by a hot-plate in the jaws of mice is decreased, the active dose, for many derivatives, being less than 50 mg./kg. by the oral route, with a lower limit of 1 mg./kg. by the oral route. On the other hand, other

| Products | Hypothermia | Ptosis | Catalepsy | Diarrhea | Dose, mg./kg. | Route |
|---|---|---|---|---|---|---|
| LA 1633 | Potentiation | + | + | + | 20 | Oral |
| LA 1674 | − | Slightly decreased | − | − | 50 | I.P. |
| LA 1688 | − | do | − | − | 50 | I.P. |
| LA 1689 | Potentiation | + | + | + | 20 | Oral |
| LA 1692 | do | Decreased | + | + | 50 | Oral |
| | | | | | 50 | I.P. |
| LA 1693 | do | do | + | + | 50 | Oral |
| | | | | | 25 | I.P. |
| LA 1694 | − | do | − | − | 50 | I.P. |
| LA 1697 | Antagonism | do | Delayed | Delayed | 50 | Oral |
| | | | | | 50 | I.P. |
| LA 1699 | − | do | − | − | 50 | I.P. |
| LA 1702 | − | do | − | − | 50 | I.P. |
| LA 1703 | − | do | − | Decreased | 50 | I.P. |
| | | | | | 100 | Oral |
| LA 1705 | Antagonism | do | Decreased | do | 50 | Oral |
| | | | | | 50 | I.P. |
| LA 1709 | Potentiation | do | + | + | 25 | Oral |
| | | | | | 50 | I.P. |
| LA 1746 | − | do | − | − | 50 | I.P. |
| LA 1750 | − | do | − | − | 25 | I.P. |
| LA 1753 | Antagonism | + | + | + | 50 | Oral |
| LA 1755 | − | Decreased | − | − | 50 | I.P. |
| LA 1757 | − | do | − | − | 50 | I.P. |
| LA 1761 | − | do | − | − | 50 | I.P. |
| LA 1762 | Potentiation | + | + | + | 50 | Oral |
| LA 1763 | Antagonism | O | O | O | 50 | Do. |
| LA 1764 | − | Decreased | − | − | 12.5 | I.P. |
| | | | | | 100 | Oral |
| LA 1768 | − | do | − | − | 50 | I.P. |
| LA 1769 | − | do | − | − | 25 | I.P. |
| LA 1771 | Potentiation | + | + | + | 50 | Oral |
| LA 1772 | Antagonism | + | + | + | 20 | Do. |
| LA 1775 | Potentiation | + | + | + | 25 | Do. |
| LA 1778 | Antagonism | − | − | − | 20 | Do. |
| LA 1779 | − | Strongly decreased | − | − | 50 | I.P. |
| LA 1781 | Antagonism | O | O | O | 50 | Oral |
| LA 1785 | do | Decreased | Decreased | Decreased | 100 | Do. |
| LA 1789 | do | do | − | − | 50 | I.P. |
| LA 1791 | Potentiation | + | + | + | 20 | Oral |
| LA 1793 | Antagonism | + | + | + | 50 | Do. |
| LA 1795 | do | + | + | + | 25 | Do. |
| LA 1800 | − | Decreased | − | − | 50 | I.P. |
| LA 1803 | − | do | − | − | 50 | I.P. |
| LA 1805 | Antagonism | do | − | − | 10 | I.P. |
| LA 1806 | − | do | − | − | 100 | Oral |
| LA 1812 | Antagonism | + | + | + | 50 | I.P. |
| LA 1815 | − | Decreased | − | − | 50 | I.P. |
| LA 1823 | − | do | − | − | 50 | I.P. |

Note.—O = antagonized action; + = non-antagonized action; − = undetermine.

derivatives reduce the reaction time of mice on the hot-plate.

| Products | Variation of reaction time to pain, percent | | Dose, mg./kg., oral route |
|---|---|---|---|
| | Increase | Decrease | |
| LA 1655 | 76 | | 50 |
| LA 1657 | 35 | | 50 |
| LA 1676 | 35 | | 1 |
| LA 1676 | 42 | | 10 |
| LA 1676 | 69 | | 50 |
| LA 1677 | 52 | | 50 |
| LA 1687 | 33 | | 50 |
| LA 1688 | 35 | | 25 |
| LA 1689 | 26 | | 25 |
| LA 1692 | 77 | | 50 |
| LA 1693 | 30 | | 5 |
| LA 1693 | 57 | | 50 |
| LA 1694 | 33 | | 50 |
| LA 1703 | 78 | | 10 |
| LA 1704 | 41 | | 50 |
| LA 1706 | 70 | | 50 |
| LA 1707 | 58 | | 50 |
| LA 1770 | 28 | | 50 |
| LA 1773 | 50 | | 50 |
| LA 1779 | 30 | | 50 |
| LA 1781 | 52 | | 50 |
| LA 1782 | 30 | | 50 |
| LA 1786 | 17 | | 50 |
| LA 1790 | 33 | | 50 |
| LA 1791 | | 9 | 50 |
| LA 1793 | 30 | | 50 |
| LA 1795 | | 33 | 50 |
| LA 1798 | 25 | | 50 |
| LA 1813 | | 15 | 50 |
| LA 1814 | 60 | | 50 |
| LA 1815 | 100 | | 75 |

When using compounds (I) against the action of nicotine administered in mice at a dosage of 1 mg./kg. by rapid intra-venous route, a protection against convulsive fits and death rate is frequently obtained; sometimes, in contrast, potentiation is obtained.

| Products | Convulsions | Death rate | Dose, mg./kg. | Route |
|---|---|---|---|---|
| LA 1674 | Complete protection | Decreased | 20 | I.P. |
| LA 1689 | do | Complete protection | 10 | I.P. |
| LA 1693 | do | do | 50 | I.P. |
| LA 1695 | Potentiation | Potentiation | 20 | I.P. |
| LA 1703 | Complete protection | Complete protection | 20 | Oral. |
| LA 1706 | do | Decreased | 20 | I.P. |
| LA 1707 | Protection | Complete protection | 20 | I.P. |
| LA 1709 | do | Decreased | 20 | I.P. |
| LA 1746 | do | do | 20 | I.P. |
| LA 1750 | Potentiation | Potentiation | 20 | I.P. |
| LA 1752 | Complete protection | Complete protection | 20 | I.P. |
| LA 1766 | Potentiation | Potentiation | 20 | I.P. |
| LA 1767 | Protection | Decreased | 20 | I.P. |
| LA 1768 | Potentiation | Potentiation | 20 | I.P. |
| LA 1778 | Protection | Decreased | 20 | I.P. |
| LA 1781 | Potentiation | Potentiation | 20 | I.P. |
| LA 1784 | do | do | 20 | I.P. |
| LA 1803 | Protection | Decreased | 20 | I.P. |
| LA 1814 | Potentiation | Without effect | 20 | I.P. |
| LA 1822 | Complete protection | Complete protection | 80 | I.P. |
| LA 1823 | Potentiation | Potentiation | 20 | I.P. |

When compounds (I) are used against the sleep-inducing action of chloral administered intra-peritoneally in mice at a dosage of 300 mg./kg., the time-to-sleep and the duration of sleep are modified.

| Products | Time-to-sleep | Duration of sleep | Dose I.P., mg./kg. |
|---|---|---|---|
| LA 1674 | Extended | Shortened | 20 |
| LA 1689 | do | | 20 |
| LA 1693 | do | Extended | 20 |
| LA 1697 | Shortened | | 20 |
| LA 1704 | Extended | Extended | 20 |
| LA 1707 | Shortened | Highly extended | 20 |
| LA 1749 | do | Extended | 20 |
| LA 1750 | do | do | 20 |
| LA 1755 | Extended | | 20 |
| LA 1756 | Shortened | Extended | 20 |
| LA 1757 | do | do | 20 |
| LA 1759 | do | do | 20 |
| LA 1762 | do | do | 20 |
| LA 1763 | do | Extended | 20 |
| LA 1764 | do | do | 20 |
| LA 1779 | do | | 20 |
| LA 1782 | Extended | | 20 |
| LA 1784 | Shortened | Extended | 20 |
| LA 1791 | Extended | | 20 |
| LA 1800 | Shortened | | 20 |
| LA 1803 | | Extended | 20 |
| LA 1806 | Slightly shortened | do | 20 |
| LA 1808 | Shortened | do | 20 |
| LA 1815 | do | do | 20 |
| LA 1822 | Extended | | 20 |
| LA 1823 | do | | 20 |

The convulsions induced in mice on rapid intravenous injection of pentamethylene tetrazol were decreased by certain compounds (I), particularly by LA 1697 at the dosage of 10 mg./kg., administered by the intraperitoneal route.

The pharmacological action in the normal animal shows the absence of behaviour disturbances in the absence of any associated medication.

No change in the performances to the traction test and to the test of the spinning rod at oral dosages of up to 100 mg./kg. in mice, for the greater majority of the compounds.

In nembutal-anesthetized cat, minimal contraction of the nictitating membrane was found with some derivatives, for example with LA 1674, at an intravenous dosage of 5 mg./kg., the contraction has an intensity equivalent to that induced by 2 $\gamma$/kg. of adrenalin administered by the intravenous route.

In rat, guinea-pig, cat and dog anesthetized either with urethane or with nembutal, bradycardia of the sinus was found to occur with the following derivatives: LA 1674, LA 1689, LA 1692, LA 1693, LA 1695, LA 1698, LA 1705, LA 1760, LA 1760, LA 1763, LA 1784, LA 1793. (For example, with LA 1793, cardiac frequency is decreased by an average of 15% at a dosage of 5 mg./kg. administered intravenously in dog.)

Changes of digitanin type are found to appear in the electrocardiogram from an intravenous dosage of 5 mg./kg.: cupuliform depression of the terminal stage and, at higher dosages: extension of auriculo-ventricular and intra-ventricular conduction in particular with LA 1692, LA 1693.

In rat, in a waking free condition, according to the individuals and according to the derivatives, systolic arterial pressure does not vary, or exhibits a variation of ±2 cm. of mercury at oral dosages of 50 mg./kg.

In rabbit, undergoing respiratory depression induced by 25 mg./kg. of morphine, some derivatives have resulted in a substantial improvement of pulmonary ventilation (LA 1674, LA 1692, LA 1693, LA 1784, LA 1793).

In rabbit, in a waking condition, the cortical electro-encephalogram exhibits perturbations at minimum dosages such as 1 to 5 mg./kg. administered intravenously, said modifications lasting one or two hours and being reproducible when the product is administered by the oral route. This was noted in particular with the following derivatives: LA 1674, LA 1689, LA 1693, LA 1703, LA 1705, LA 1707.

On the isolated duodenum of rat, compounds (I) have antagonized the acetylcholine induced contraction and/or the barium chloride induced contraction, thus exhibiting an atropine-like or papaverine-like action in the ratios indicated in the following table:

| Products | Comparative action with— | |
|---|---|---|
| | Atropine | Papaverine |
| LA 1665 | 1/500 | 1/1 |
| LA 1689 | 1/750 | 6/1 |
| LA 1690 | | 1/5 |
| LA 1691 | | 1/5 |
| LA 1692 | | 2/1 |
| LA 1693 | 1/300 | 1/1 |
| LA 1694 | | 1/5 |
| LA 1695 | | 1/2 |
| LA 1699 | 1/1,000 | 1/1 |
| LA 1702 | | 1/5 |
| LA 1707 | 1/300 | |
| LA 1764 | 1/500 | |
| LA 1779 | 1/750 | |
| LA 1782 | 1/500 | |
| LA 1789 | 1/500 | |
| LA 1793 | 1/1,000 | 1/5 |
| LA 1798 | 1/1,000 | 1/1 |
| LA 1799 | 1/300 | |

Inflammation tests, either as first stage inflammation with carrageenin or as second stage inflammation on inclusion of filter-paper discs, were not influenced, in particular with LA 1703.

It is therefore apparent that compounds (I) have high therapeutical value, since they possess predominantly psychotropic properties which are reflected in at least one of the following activities:

they are active on activity and activometry, increasing same at low dosages and reducing it as high dosages;
on the electroencephalogram, they produce, in bursts, either peaks or slow waves;
they decrease or cancel the group toxicity of amphetamine;
some have an antagonistic effect with respect to reserpine from the standpoint of the central and peripheral effects of the latter; others, in contrast, act in the same direction as reserpine;
they are extremely active anti-tremorine agents active at low dosages and by the oral route;
they are efficient oral analgesic agents;
they are inhibitors of β sympathetic receptors;
they have an influence on the action of apomorphine and on phenothiazine-induced catatonia;
they act on the cardio-respiratory system as analeptic and bradycardia-inducing agents, which makes them highly advantageous over the presently used neuroleptic or antidepressive agents.

The clinical applications were found consistent with what had been predicted from pharmacological experimentation.

Generally, different and frequently opposite activities are produced at low and high dosages. Similarly, the applications are not identical: minimum dosages are rather applicable to neuroses and higher dosages to psychoses; this explains the very broad spectrum of useful dosages.

The triazines according to the invention act on the central nervous system: thus:

(a) LA 1689 was found efficient as anxiolytic and antidepressive agent at daily dosages varying from 2 to 1000 mg., according to the desired effects;

(b) LA 1692 and LA 1693, at daily dosages of from 5 to 850 mg. exhibit stimulating, anti-hallucinatory and antidepressive properties;

(c) LA 1763 and LA 1781, at daily dosages of 25 to 750 mg., have cured endogenous depressions;

(d) LA 1778, LA 1693 and LA 1798, at daily dosages of from 15 to 500 mg., have been found active against motor trembling;

(e) LA 1703, LA 1755 and LA 1803, at dosages of from 2 to 900 mg./kg., were found effective, according to the dosage, in a broad spectrum of anguish-type neuroses and of manic-depressive and hallucinatory psychoses;

(f) LA 1692, LA 1693 and LA 1784, at daily dosages of from 100 to 1000 mg. have produced a measurable stimulation of respiration together with a slowing down of the heart. These triazines have therapeutical usefulness in respiratory difficulties and as cardio-circulatory analeptic agents.

In cases of general anesthesia, triazines (I) have increased respiration, facilitated awakening and decreased the sequelae of the anesthesia.

In cases of cardiac insufficiency, triazines (I), at the same dosage levels, slowed down the heart and improved cardiac compensation.

LA 1762 was found effective as a modulating agent of the adrenal gland.

Triazines (I) are free from hematologic, renal or hepatic toxicity at clinically useful dosages.

The therapeutically preferable triazines are presently: LA 1674, LA 1689, LA 1692, LA 1693, LA 1703, LA 1750, LA 1755, LA 1762, LA 1778, LA 1793, LA 1798, LA 1803, LA 1814, LA 1815, LA 1816, LA 1822, and LA 1837.

Triazines (I) may be administered in the form of capsules, tablets, syrup, granules, coated tablets with the excipients and vehicles suitable for the routes of administration adapted to such pharmaceutical forms.

Triazines (I) may also be administered in the form of suppositories and of intramuscular or intra-venous injection, either dissolved or dispersed in a suitable solvent, or bound with a delaying vehicle.

Generally, the dosage varies from about 2 to about 1000 mg. of active principle per 24 hours, each unit dose containing about 1–500 mg. of active principle.

It results from the above data that triazines (I) are free from toxicity and as have with a very broad spectrum of activity on the central nervous system, thereby permitting important new therapeutical applications in neuro-psychiatry and in the field of respiratory and cardiac reanimation.

Having now described our invention what we claim as new and desire to secure by Letters Patent is:

1. A compound selected from the group consisting of a triazine of the formula:

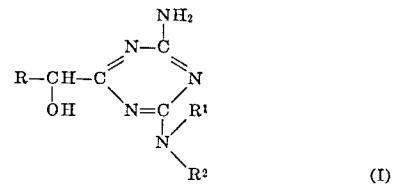

(I)

wherein R is selected from the group consisting of hydrogen, lower alkyl, methylene-dioxy-phenyl, phenyl, phenyl monosubstituted with a substituent selected from halogen, lower alkyl, halo-lower alkyl and lower alkoxy, phenyl disubstituted with substituents selected from halogen, lower alkyl, halo-lower alkyl and lower alkoxy and phenyl tri-substituted with substituents selected from halogen, lower alkyl, halo-lower alkyl and lower alkoxy, $R^1$ and $R^2$ are selected from the group consisting of hydrogen, lower alkyl, lower alkenyl, cyclo-lower alkyl, di-lower alkylamino-lower alkyl, piperidino-lower alkyl and morphoino-lower alkyl, one of substituents $R^1$ and $R^2$ being other than a member selected from hydrogen and alkyl when the other substituent is itself a member selected from hydrogen and alkyl and the pharmaceutically acceptable acid addition salts thereof.

2. 2 - amino-4-α-hydroxy-n-propyl-6-diethylaminoethylamino-1,3,5-triazine.

3. 2 - amino - 4-α-hydroxy-n-propyl-6-(N-methyl-N-dimethylaminoethyl)-amino-1,3,5-triazine.

References Cited
UNITED STATES PATENTS

| | | | |
|---|---|---|---|
| 3,086,855 | 4/1963 | Knusli et al. | 260—249.9 X |
| 3,152,181 | 10/1964 | Shapiro et al. | 260—249.9 X |
| 3,169,964 | 2/1965 | Calderbank et al. | 260—249.9 |
| 3,522,255 | 7/1970 | Heimberger | 260—249.9 |
| 3,583,986 | 6/1971 | Heimberger | 260—249.9 |

JOHN M. FORD, Primary Examiner

U.S. Cl. X.R.

424—249; 260—564; 424—326; 260—247.5, 268 R, 293.87